Feb. 4, 1964   S. J. CARCIONE   3,120,013
SKIVING DEVICE
Filed April 13, 1962   2 Sheets-Sheet 2
FIG. 3
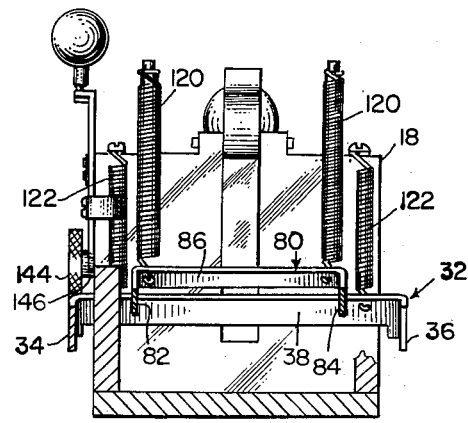
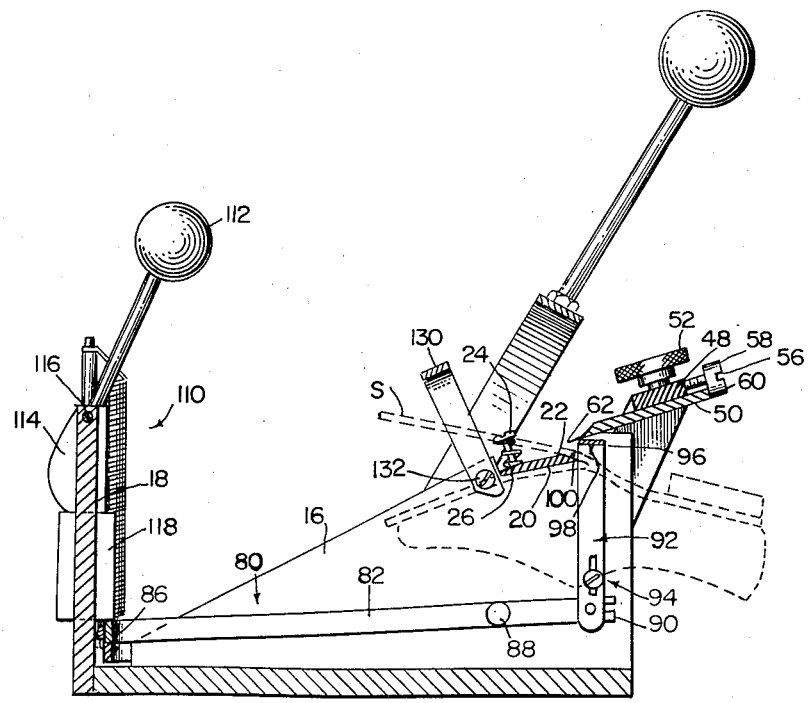
FIG. 4
INVENTOR.
SOLLY J. CARCIONE
BY
Ezekiel Wolf, Wolf & Greenfield
ATTORNEYS

United States Patent Office 3,120,013
Patented Feb. 4, 1964

3,120,013
SKIVING DEVICE
Solly J. Carcione, Medford, Mass., assignor to Pilgrim Shoe & Sewing Machine Co., Inc., Boston, Mass., a corporation of Massachusetts
Filed Apr. 13, 1962, Ser. No. 187,335
8 Claims. (Cl. 12—39.5)

This invention relates to cutting devices and more particularly comprises a new and improved skiver designed to be used by shoemakers.

The equipment now used in shoe repairing establishments for removing a portion of a worn sole needing replacement is often quite large, relatively expensive, and not very precise. Such equipment is also difficult to adjust, if adjustments are possible at all, and does not function in a manner to produce matching cuts on different pieces of material.

The primary object of this invention is to provide a skiver which will perform dependably and accurately the operations normally required of it and which is considerably less expensive as well as much smaller than skiving machines now available.

Yet another object of this invention is to provide a skiver which may be precisely adjusted to vary both the angle and location of cuts made in stock held by the skiver.

To accomplish these and other objects the skiver of this invention includes a fixed but adjustable cutting bar and a movable cutting blade disposed adjacent the bar, which moves along a path toward and away from the bar and which defines an acute angle with the bar. A gripping device is operatively associated with the bar to hold in place the stock to be cut on the machine. Disabling means are secured to both the gripping device and the blade and are simultaneously activatable to permit a piece of stock to be quickly mounted in and removed from the machine.

These and other objects and features of this invention, along with its incident advantages, will be better understood and appreciated from the following detailed description of one embodiment thereof, selected for purposes of illustration and shown in the accompanying drawing, in which:

FIGS. 3 and 4 are cross sectional views taken along the corresponding section lines in FIGS. 1 and 2, respectively.

Figures 1, 2:
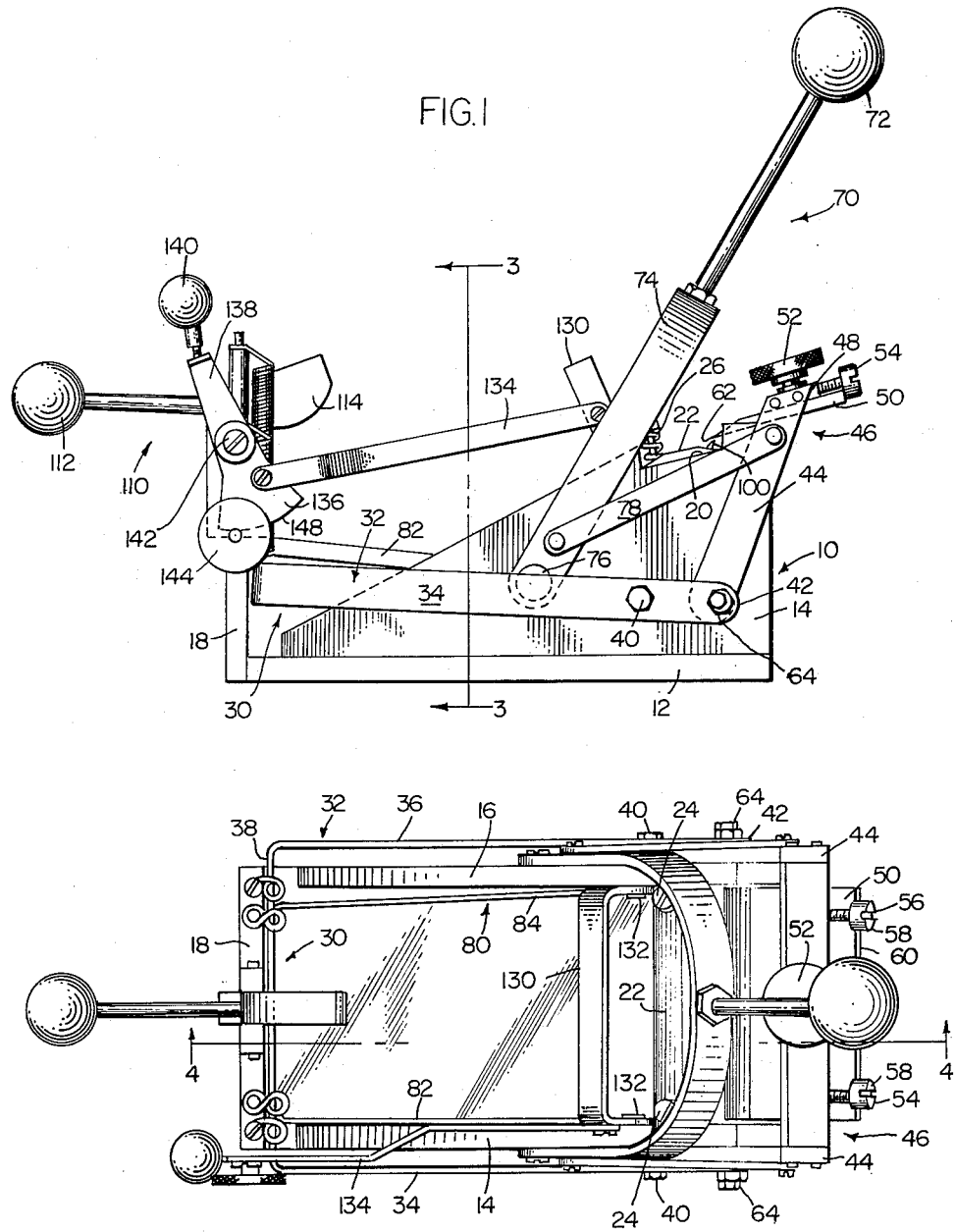
FIG. 1 is a side view of a skiver constructed in accordance with this invention.
FIG. 2 is a top view of the skiver shown in FIG. 1.

The skiver shown in the drawing is assembled on a frame 10 having a bed 12, a pair of side walls 14 and 16, and an end wall 18. The side walls 14 and 16 and the end wall 18 support virtually all of the operative parts of the device.

The side walls 14 and 16 are provided at their top with seats 20 on which is supported cutting bar 22. The cutting bar rests on the seats, and a pair of machine screws 24 pass through the bar adjacent one edge thereof and screw into the base of the seats 20 and carry springs 26 that act in compression to urge the bar 22 on the seats. It will be appreciated from an inspection of the drawings that an upwardly directed force applied to the cutting bar 22 may compress the springs 26 to alter the position of the bar on the seats. To remove the bar 22 from the seats on the side walls 14 and 16 it is only necessary to remove the screws 24.

In FIGS. 1 and 2 the side walls 14 and 16 are shown to gradually reduce in height toward the end wall 18 and terminate short of the end wall to form a gap 30 within which several operative parts are disposed. One of these parts is a generally U-shaped member 32 having a pair of arms 34 and 36 disposed immediately adjacent and outside the side walls 14 and 16, respectively. The base 38 of the member 32 is disposed in the gap 30 just inside the face of end wall 18. The arms 34 and 36 are pivoted on studs 40 secured to the side walls 14 and 16, which studs are substantially closer to the free ends 42 of the arms 34 and 36 than the ends of those arms joined by the base 38.

The ends 42 of the arms 34 and 36 each carry upstanding legs 44 that are part of a blade support 46. The blade support 46 also includes a cross member 48 joined to the upper ends of the arms 44, and the cross member 48 carries beneath it a cutting blade 50 retained on the cross member by the retaining screw 52. This arrangement is clearly shown in FIGS. 1 and 4.

The blade 50 spans the space between the side walls 14 and 16 of the frame, and the blade 50 is supported in a plane slightly inclined with respect to the upper surface of the cutting bar 22. Thus, the blade 50 and the upper surface of the cutting bar 22 form a very acute angle with one another. The alignment of the cutting edge 62 of blade 50 with respect to the bar 22 is controlled by a pair of adjusting screws 54 and 56 screwed into the side of the cross member 48 with their heads 58 engaging the rear edge 60 of the blade 50 adjacent the blade ends. To align the edge 62 with the cutting bar 22, the screws 54 and 56 may either be tightened or loosened as required to pivot the blade on the retaining screw 52.

The blade 50 and its support 46 are pivotally movable because of the manner in which the legs 44 are secured to the ends 42 of the arms 34 and 36, respectively. That is, the blade 50 may be moved to the left as viewed in FIG. 1, toward the cutting bar 22 by pivoting the legs 44 counterclockwise on the connecting pins 64 which join the lower ends of the legs 44 and the ends 42 of the arms 34 and 36. In use this pivotal movement of the support 46 and blade 50 is achieved by the actuator 70 which includes a handle 72 secured to a yoke 74 having arms that are pivotally mounted on stub shafts 76 extending outwardly from the sides of the walls 14 and 16. Just upwardly of the shafts 76 the yoke 74 is joined to the upper ends of the legs 44 by links 78. Thus, referring to FIG. 1, when the actuator 70 is pivoted counterclockwise on the shafts 76, the links 78 apply a force to the legs 44 causing them to pivot counterclockwise about their pins 64.

A second U-shaped member 80 is disposed generally parallel to and in the plane of the U-shaped member 32, but within the side walls 14 and 16. The U-shaped member 80 includes a pair of arms 82 and 84 joined at their ends in the gap 30 by the base member 86, and the arms 82 and 84 are pivotally secured to the inner sides of the walls 14 and 16 by pins 88, as clearly shown in FIG. 4. The pivotal supports of the arms 82 and 84 lie close to the free ends 90 of those arms which in turn are linked to an inverted U-shaped member 92 which in turn is secured for sliding vertical movement on the insides of the walls 14 and 16 by pin and slot connectors 94 (see FIG. 4). When the U-shaped member 80 is pivoted counterclockwise on its pins 88, the inverted U-shaped member 92 rises substantially vertically in the frame.

The lower surface of the cross member 96 of the inverted U-shaped member 92 carries a plurality of downwardly extending pins 98 which cooperate with a plurality of upwardly extending pins 100 mounted on the rear adjacent edge of the cutting bar 22. The pins 98 and 100 serve to grip the stock placed in the skiver and prevent it from moving when the cutting blade 50 is actuated. In FIG. 4 a shoe shown in broken lines in an inverted position with its sole S lying between the cross member 96 and the rear edge of the cutter bar 22. When the blade 50 is moved to the left as shown in that figure, the cutting action tends to pull the sole with it, but the pins 98 and 100 resist movement of the sole so that the cut is clean and straight.

In FIG. 1 it will be noted that the cutting blade 50 normally is disposed very close to the upper surface of the bar 22, and particularly because of the presence of the pins 100 it would be difficult if not impossible to insert a heavy piece of stock between the cutting blade and bar. Moreover, the position of the cross member 96 of the inverted U-shaped member 92 would ordinarily interfere with the insertion of a piece of stock between the blade and bar. Therefore, an actuating mechanism 110 is provided for elevating both the blade support 46 and the inverted U-shaped member 92 with respect to the bar 22. The actuating mechanism 110 is suppjorted on the end wall 18 of the frame. The mechanism includes a handle 112 secured to a cam 114 pivotally mounted in a slot in the end wall 18 by pin 116. The cam 114 rests upon a block 118 also disposed in the slot in the end wall 18 and which in turn engages the base member 86 of the U-shaped member 80. It will be noted in FIG. 4 that the base 86 of the U-shaped member 80 is aligned vertically with the base 38 of the other U-shaped member and is disposed above it. Thus, when the base 86 is moved downwardly in the frame it will engage and carry with it the member 38.

In FIG. 3 it will be noted that a pair of springs 120 are secured to the ends of the base 86 and extend upwardly and are secured to the top of pins mounted on the top of the wall 18. These springs urge the member 86 upwardly and thus bias the U-shaped member 80 to an extreme clockwise position on the pins 84 as viewed in FIG. 4. A similar pair of springs 122 are secured to the ends of the member 38 and urge it upwardly and the U-shaped member 32 to an extreme clockwise position as viewed in FIG. 1. When the actuating mechanism 110 is in the inactive position illustrated in FIG. 1 the springs 120 and 122 serve their described purpose. However, when the mechanism 110 is moved to the position shown in FIG. 4, the cam 114 pushes the block 118 downwardly within the slot in the wall 18 and it in turn pushes the members 86 and 38 downwardly to pivot the U-shaped members counterclockwise as viewed in the drawings. Counterclockwise movement of the U-shaped member 32 lifts the legs 44 and thus the support 46 of the blade 50 to lift the blade in turn away from the cutting bar 22. Similar action of the U-shaped member 80 elevates the inverted U-shaped member 92 and more particularly its cross member 96 from the cutting bar 22. When this is done a substantial gap is created between the cutting bar on the one hand and the cross member 96 and the blade 50 on the other so that a piece of stock may readily be inserted in place on the bar. When the cam 114 is released by actuation of the handle 112 the springs 120 and 122 take over causing the cross member 96 and more particularly its pins 98 to cooperate with the pins 100 to firmly grasp and hold the stock positioned on the bar. Similarly the support 46 for the blade 50 lowers to a position wherein its actuation by the handle 72 will cut the stock.

One other adjustment is provided in the mechanism, namely, that for varying the angle of the bar 22 with respect to the stroke of the blade 50. As suggested above, the bar 22 is biased on the seats 20 on the walls 14 and 16 by the springs 26 about the screws 24. It will be noted in the drawings that a generally U-shaped lifter 130 is pivotally mounted on the side walls 14 and 16 of the frame by pins 132 immediately adjacent the edge of the cutting bar 22 held in place by the springs 26. Thus, when the lifter 130 is moved counterclockwise as viewed in FIG. 4 its lower end will engage the adjacent edge of the bar 22 and lift it against the bias of the springs 26. This lifting action will be confined generally to the forward edge of the bar 22 so that its position will be varied pivotally with respect to the stroke or position of the blade 50. When the forward or spring biased edge of the bar 22 is elevated, the cut of the blade 50 will be increased in steepness; that is, it will more nearly approach a plane perpendicular to the faces of the stock.

In FIGS. 1 and 2 the lifter 130 is shown linked by connector 134 to the sector shaped end 136 of an adjusting lever 138. The lever 138 carries a handle 140 at its upper end. Thus, when the handle 140 is moved to the right as viewed in FIG. 1, the lever pivots clockwise on its pivotal support 142 and the connector 134 moves to the left, causing the lifter 130 to pivot counterclockwise and elevate the biased edge of the bar 22. The position of the lever 138 is maintained by a keeper 144 in the form of a knurled screw provided with a slot 146 which receives the curved edge 148 of the sector shaped portion 136 of the lever. Thus, when the position of the bar 22 is selected by means of movement of the adjusting lever 138 the keeper 144 is tightened so that the slot 146 reduces in size and binds the lower edge 148 of the segment shaped portion 136 of the lever. Thus it will be recognized that the adjusting lever 138 and its associated parts work against the bias of the springs 26 to alter the position of the bar 22.

Having described the various components of the skiver, its operation will be described briefly. When a shoe is to be half-soled the shoemaker cuts the stitching which joins the forepart of the sole to the upper so that it is free of the upper as suggested in FIG. 4. He then moves the handle 112 to the position shown in FIG. 4 to open the gap between the blade 50 and cross member 96 and the bar 22. When this is done the shoemaker slips the shoe into the position shown in FIG. 4 and releases the actuator 110 so that the pins 98 and 100 bite into and hold the sole. The shoemaker then may vary the position of the bar 22 by adjusting the lever 138 as described. When the desired angle for the bar 22 is achieved he then merely pushes the handle 72 to the left as viewed in FIG. 1 so that the blade 50 severs the sole and more particularly its forepart. The blade is then returned to the position shown in FIG. 1 and the actuator 110 is again moved to the position shown in FIG. 4 to release the gripper. Next the shoemaker may repeat this operation on the replacement half sole to achieve the same angle of cut on the sole to be placed on the shoe. That is, he will cut the rear portion of the replacement sole so that it will have the same angle at its rear part as the angle left by the blade 50 when the worn sole was removed. When this is done a virtually perfect mate is provided between the rear of the new half sole and the forward portion of the remaining part of the old sole.

Having described this invention in detail those skilled in the art will appreciate that numerous modifications may be made of it without departing from its spirit. Therefore, it is not intended that the breadth of this invention be limited to the specific embodiment illustrated and described. Rather, it is intended that the breadth of this invention be determined by the appended claims and their equivalents.

What is claimed is:

1. A skiving machine comprising
   a frame,
   a cutter bar extending across the frame,
   a skiving blade disposed above the bar,
   actuating means secured to the blade and mounted on the frame for moving the blade toward and away from the bar with the path of travel of the blade and the bar defining an acute angle,
   a plurality of pins extending upwardly from the surface of the bar,
   a gripper disposed above the bar and beneath the blade and carrying a plurality of pins facing the pins on the bar,
   said pins on the gripper and cutting bar cooperating to hold a piece of material to be skived,
   means secured to the cutting blade and gripper for simultaneously varying their height above the cutting bar, and adjusting means secured to the frame and the cutting bar for varying its angular position with respect to the blade.

2. A skiving machine comprising
a frame,
a cutting bar mounted on the frame,
means operatively associated with the bar for retaining material to be skived on the bar,
a cutting blade disposed adjacent the bar and movable toward and away from the bar to cut material on the bar,
and means secured to both the blade and the first-recited means for simultaneously disabling said means and moving the cutting blade away from the bar to enable material to be mounted on the bar.

3. A skiving machine as defined in claim 2 further characterized by adjusting means secured to the bar for varying its angle with respect to the stroke of the blade.

4. A skiving machine comprising
a frame having a pair of spaced side walls,
a seat formed on the walls,
a cutting bar disposed on the seat and yieldably biased against the seat,
gripping means operatively associated with the bar for retaining material to be skived in position on the bar,
a blade support pivotally mounted adjacent the side walls,
a blade mounted on the support and disposed at an acute angle with the bar,
means for actuating the support for moving the blade in substantially said acute angle toward and away from the bar,
and means for elevating the support to move the blade away from the bar to enable material to be slipped between the bar and blade and be held by the gripping means.

5. A skiving machine as defined in claim 4 further characterized by the last recited means being operatively connected to the gripping means and disabling the gripping means when the support is elevated and rendering the gripping means operative when the support is lowered.

6. A skiving machine as defined in claim 4 further characterized by adjusting means secured to the bar for moving it from the biased position to another position at a different angle to the cutting blade.

7. A skiving machine comprising
a frame,
a cutting bar secured to the frame,
a movable blade mounted on the frame and movable toward and away from the bar,
a gripping device disposed adjacent the bar and movable toward and away from the bar,
and means connected to the blade and gripping means for simultaneously disabling said blade and gripping means.

8. A skiving machine comprising
a frame,
cutting means mounted on the frame,
a gripping device mounted on the frame and cooperating with a part of the cutting means for retaining stock on the cutting means to be skived,
and means secured to the cutting means and the gripping device for simultaneously disabling the cutting means and the device.

References Cited in the file of this patent
UNITED STATES PATENTS

| | | |
|---|---|---|
| 1,796,020 | Haberman | Mar. 10, 1931 |
| 2,223,064 | Garzilli et al. | Nov. 26, 1940 |
| 2,607,058 | Ferguson | Aug. 19, 1952 |